United States Patent
Chang

(10) Patent No.: US 12,358,522 B2
(45) Date of Patent: Jul. 15, 2025

(54) APPARATUS FOR GENERATING VIBRATION FOR VEHICLE, AND METHOD THEREOF

(71) Applicants: HYUNDAI MOTOR COMPANY, Seoul (KR); Kia Corporation, Seoul (KR)

(72) Inventor: Kyoung Jin Chang, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 307 days.

(21) Appl. No.: 17/667,788

(22) Filed: Feb. 9, 2022

(65) Prior Publication Data
US 2022/0388529 A1    Dec. 8, 2022

(30) Foreign Application Priority Data

Jun. 8, 2021   (KR) .......................... 10-2021-0074376

(51) Int. Cl.
*B60W 50/16*      (2020.01)
*B60N 2/90*       (2018.01)
(Continued)

(52) U.S. Cl.
CPC .............. *B60W 50/16* (2013.01); *B60N 2/90* (2018.02); *B60W 40/08* (2013.01);
(Continued)

(58) Field of Classification Search
CPC .. B60W 50/16; B60W 40/08; B60W 2540/21; B60W 2540/221; B60W 2420/403; B60W 40/105; B60W 2040/0872; B60W 2040/0881; B60W 2040/089; B60W 2050/143;
(Continued)

(56) References Cited

U.S. PATENT DOCUMENTS

| 8,638,966 B2 * | 1/2014 | Taylor .................... H04R 5/023 381/301 |
| 9,682,622 B2 | 6/2017 | Kim et al. |

(Continued)

FOREIGN PATENT DOCUMENTS

| EP | 3205560 A1 * | 8/2017 | ............... B60Q 9/00 |
| JP | 2018-5343 A  | 1/2018 | |

(Continued)

OTHER PUBLICATIONS

English Translation of JP-2019209932-A (Year: 2019).*

*Primary Examiner* — Peter D Nolan
*Assistant Examiner* — Preston Jay Miller
(74) *Attorney, Agent, or Firm* — MORGAN, LEWIS & BOCKIUS LLP

(57) ABSTRACT

The present disclosure relates to a vibration generating apparatus for a vehicle including a state analysis device that generates analysis information based on the state information, a vibration signal modeling information generation device that generates vibration signal modeling information for the vibration of the vehicle based on the generated analysis information, and a vibration signal generation device that generates a vibration signal based on the generated vibration signal modeling information and driving information of the vehicle.

12 Claims, 6 Drawing Sheets

(51) Int. Cl.
  *B60W 40/08* (2012.01)
  *G06V 20/59* (2022.01)
  *G06V 40/16* (2022.01)
  *G06V 40/18* (2022.01)

(52) U.S. Cl.
  CPC ............ *G06V 20/597* (2022.01); *G06V 40/16* (2022.01); *G06V 40/18* (2022.01); *B60N 2002/981* (2018.02); *B60W 2540/21* (2020.02); *B60W 2540/221* (2020.02)

(58) Field of Classification Search
  CPC ................. B60W 2520/10; B60N 2/90; B60N 2002/981; G06V 20/597; G06V 40/16; G06V 40/18; G06V 10/82; G06V 40/174; G01M 7/025; G01M 7/022; G06N 20/00
  USPC .......................................................... 701/36
  See application file for complete search history.

(56) References Cited

U.S. PATENT DOCUMENTS

| | | | |
|---|---|---|---|
| 9,868,332 B2 * | 1/2018 | Anderson | ............ B60G 99/002 |
| 10,449,856 B2 | 10/2019 | Kojima | |
| 11,027,608 B2 | 6/2021 | Kojima | |
| 2008/0119994 A1 * | 5/2008 | Kameyama | ........... B60W 40/08 |
| | | | 701/1 |
| 2014/0292521 A1 * | 10/2014 | Perle | ........................ G08B 6/00 |
| | | | 340/575 |
| 2015/0328985 A1 | 11/2015 | Kim et al. | |
| 2016/0278530 A1 | 9/2016 | Kim et al. | |
| 2018/0015933 A1 | 1/2018 | Truong | |
| 2020/0057487 A1 * | 2/2020 | Sicconi | ................... G06F 3/011 |
| 2020/0215294 A1 | 7/2020 | Lee et al. | |
| 2020/0216093 A1 | 7/2020 | Lee et al. | |
| 2021/0146090 A1 | 5/2021 | Lee et al. | |
| 2021/0261050 A1 * | 8/2021 | Sobhany | .................. B60Q 3/80 |
| 2022/0183925 A1 * | 6/2022 | Manwaring | ........ A61H 23/0245 |
| 2022/0269474 A1 | 8/2022 | Chang et al. | |
| 2022/0340064 A1 * | 10/2022 | Soltner | .................. A61H 1/005 |

FOREIGN PATENT DOCUMENTS

| | | | | |
|---|---|---|---|---|
| JP | 2019209932 A | * | 12/2019 | |
| JP | 2020-29210 A | | 2/2020 | |
| KR | 10-1485264 B1 | | 1/2015 | |
| KR | 10-2015-131634 A | | 11/2015 | |
| KR | 10-1714089 B1 | | 3/2017 | |
| KR | 10-2018-0001094 A | | 1/2018 | |
| KR | 10-1879209 B1 | | 7/2018 | |
| KR | 10-1880123 B1 | | 7/2018 | |
| KR | 10-1910863 B1 | | 10/2018 | |
| KR | 10-2020-085525 A | | 7/2020 | |
| KR | 10-2020-085969 A | | 7/2020 | |
| KR | 10-2182098 B1 | | 12/2020 | |
| KR | 10-2022-0120741 A | | 8/2022 | |
| WO | WO-2020167430 A2 | * | 8/2020 | ............. B06B 1/161 |

* cited by examiner

APPARATUS FOR GENERATING VIBRATION FOR VEHICLE, AND METHOD THEREOF

CROSS-REFERENCE TO RELATED APPLICATION

This application claims the benefit of priority to Korean Patent Application No. 10-2021-0074376, filed in the Korean Intellectual Property Office on Jun. 8, 2021, the entire contents of which are incorporated herein by reference.

TECHNICAL FIELD

The present disclosure relates to an apparatus for generating vibration for a vehicle, and a method thereof.

BACKGROUND

Generally, an existing vibration generating technology for a vehicle generates vibration for a vehicle and delivers the vibration to a driver of the vehicle through a seat or steering wheel of the vehicle. However, the vibration is generated and delivered through a consistent generation method, and thus the technology does not take into account the driver's physical state or emotion.

Furthermore, there is a system that generates a vibration warning in steering wheels of some vehicles. However, this also does not take into account the driver's physical state or emotion.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an apparatus for generating vibration for a vehicle in consideration of a driver's physical state or emotion, and a method thereof.

Furthermore, an aspect of the present disclosure provides an apparatus for generating vibration for a vehicle further in consideration of a driving warning state of the vehicle, together with the driver's physical state or emotion.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for generating vibration for a vehicle may include a state analysis device that generates analysis information based on the state information, a vibration signal modeling information generation device that generates vibration signal modeling information for the vibration of the vehicle based on the generated analysis information, and a vibration signal generation device that generates a vibration signal based on the generated vibration signal modeling information and driving information of the vehicle.

Furthermore, according to embodiments, the state information of the driver may include at least one of driver image information, driver voice information, or driver biometric signal information.

Moreover, according to embodiments, the state analysis device may include an image analysis device that generates image analysis information based on the driver image information, a voice analysis device that generates voice analysis information based on the driver voice information, and a biometric signal analysis device that generates biometric signal analysis information based on the driver biometric signal information. The analysis information may include at least one of the image analysis information, the voice analysis information, or the biometric signal analysis information.

Besides, according to embodiments, the driver image information may include at least one of a face image of the driver or a pupil image of the driver. The driver biometric signal information may include at least one of pulse information of the driver, body temperature information of the driver, or brain wave information of the driver.

Also, according to embodiments, the vibration signal modeling information may include one or more vibration components. The vibration components may include at least one of a beat vibration component or a harmony vibration component. The vibration signal modeling information may include at least one of period information of each of the one or more vibration components, playback time point information of each of the one or more vibration components, stop time point information of each of the one or more vibration components, or playback time information of each of the one or more vibration components.

In addition, according to embodiments, the vibration signal modeling information may be generated after the analysis information is entered into an artificial intelligence learning model.

Furthermore, according to embodiments, when the analysis information based on the state information of the driver of the vehicle is input, the artificial intelligence learning model may be learned to output vibration signal modeling information corresponding to the input analysis information.

Moreover, according to embodiments, the driving information may include speed information of the vehicle. The vibration signal may be generated based on at least one of the vibration signal modeling information or warning vibration signal modeling information.

Besides, according to embodiments, the vibration signal may be generated based on the vibration signal modeling information and the warning vibration signal modeling information in response to a fact that the driving information indicates that the vehicle is in a driving disturbance state, and may be generated based on the vibration signal modeling information when the driving information indicates that the vehicle is not in the driving disturbance state.

Also, according to embodiments, the generated vibration signal may be delivered to at least one of a seat of the vehicle or a steering wheel of the vehicle.

According to an aspect of the present disclosure, a method for generating vibration for a vehicle may include receiving, by a processor, state information of a driver of the vehicle and generating, by the processor, analysis information based on the state information, generating, by the processor, vibration signal modeling information for the vibration of the vehicle based on the generated analysis information, and generating, by the processor, a vibration signal based on the generated vibration signal modeling information and driving information of the vehicle.

Furthermore, according to embodiments, the state information of the driver may include at least one of driver image information, driver voice information, or driver biometric signal information.

Moreover, according to embodiments, the generating of the analysis information may include generating image analysis information based on the driver image information, generating voice analysis information based on the driver voice information, and generating biometric signal analysis information based on the driver biometric signal information. The analysis information may include at least one of the image analysis information, the voice analysis information, or the biometric signal analysis information.

Besides, according to embodiments, the driver image information may include at least one of a face image of the driver or a pupil image of the driver. The driver biometric signal information may include at least one of pulse information of the driver, body temperature information of the driver, or brain wave information of the driver.

Also, according to embodiments, the vibration signal modeling information may include one or more vibration components. The vibration components may include at least one of a beat vibration component or a harmony vibration component. The vibration signal modeling information may include at least one of period information of each of the one or more vibration components, playback time point information of each of the one or more vibration components, stop time point information of each of the one or more vibration components, or playback time information of each of the one or more vibration components.

In addition, according to embodiments, the vibration signal modeling information may be generated after the analysis information is entered into an artificial intelligence learning model.

Furthermore, according to embodiments, when the analysis information based on the state information of the driver of the vehicle is input, the artificial intelligence learning model may be learned to output vibration signal modeling information corresponding to the input analysis information.

Moreover, according to embodiments, the driving information may include speed information of the vehicle. The vibration signal may be generated based on at least one of the vibration signal modeling information or warning vibration signal modeling information.

Besides, according to embodiments, the generating of the vibration signal may include generating the vibration signal based on the vibration signal modeling information and the warning vibration signal modeling information when the driving information indicates that the vehicle is in a driving disturbance state and generating the vibration signal based on the vibration signal modeling information when the driving information indicates that the vehicle is not in the driving disturbance state.

Also, according to embodiments, the method may further include delivering the generated vibration signal to at least one of a seat of the vehicle or a steering wheel of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
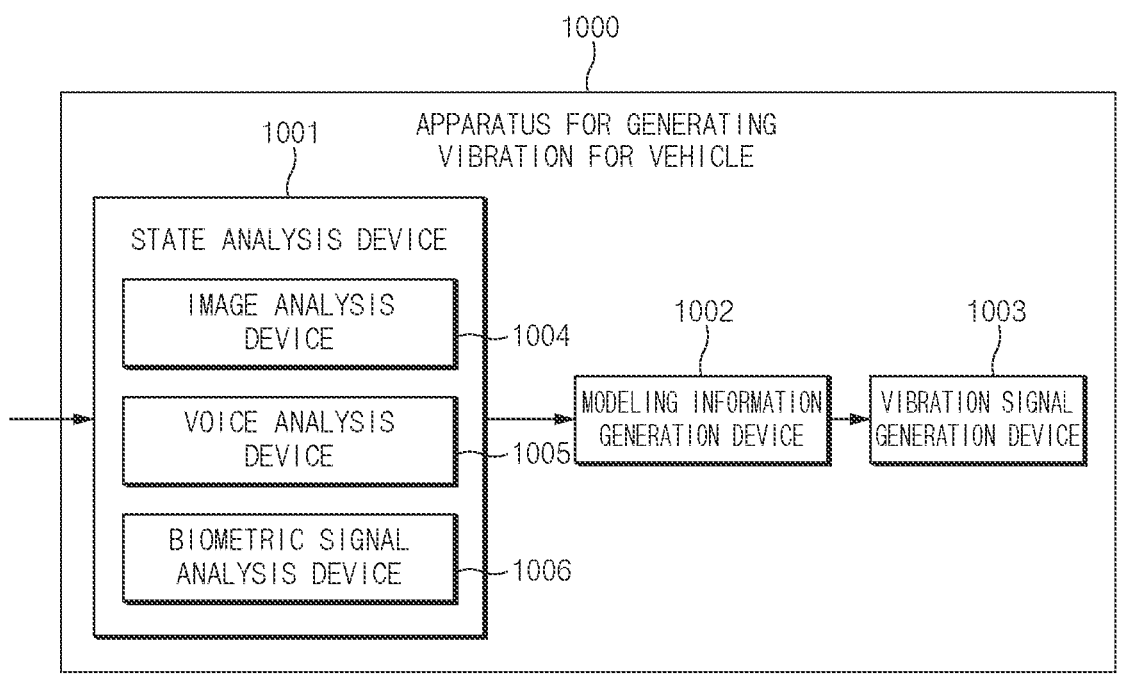
FIG. 1 illustrates an example of an apparatus for generating vibration for a vehicle, according to embodiments.

Hereinafter, some embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matters of the present disclosure unnecessarily obscure.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 6.

FIG. 1 illustrates an example of an apparatus for generating vibration for a vehicle, according to embodiments.

This drawing shows an example of an apparatus (or device) 1000 for generating vibration for a vehicle, according to embodiments.

Generally, a vehicle generates vibration and delivers the vibration to a driver of the vehicle through a seat or steering wheel. However, the vibration is generated and delivered through a consistent method, and thus the technology does not take into account the driver's physical state or emotion. Furthermore, there is a system that generates a vibration warning in steering wheels of some vehicles. However, this also does not take into account the driver's physical state or emotion.

The apparatus 1000 according to embodiments may generate an appropriate vibration signal by determining a vehicle driver's physical state or emotion. That is, the apparatus 1000 according to embodiments generates a vibration signal, to which the driver's body state and/or emotional state is reflected, while the vehicle is driven, may determine a driving disturbance state such as a speeding behavior, and may generate an appropriate vibration.

The apparatus 1000 according to embodiments may include a processor that has an associated non-transitory memory storing software instructions which, when executed by the processor, provides the functionalities of a state analysis device 1001, a modeling information generation device 1002, and/or a vibration signal generation device 1003. Here, the processor may process signals transmitted between elements of the apparatus 1000, and in particular may process signals communicated between the state analysis device 1001, the modeling information generation device 1002, and the vibration signal generation device 1003 between each element of the apparatus 1000 and other components of the vehicle (e.g., a seat or steering wheel of the vehicle). In some exemplary embodiments, the processor may take the form of one or more processor(s) and associated memory storing program instructions. The apparatus 1000 according to embodiments may further include one or more elements not shown in FIG. 1.

The state analysis device 1001 according to embodiments may receive state information of a driver of a vehicle and may generate analysis information based on the state information. The driver's state information according to embodiments may indicate information for recognizing the driver's physical state or emotion. For example, the driver's state information includes at least one of driver image information, driver voice information, or driver biometric signal information. The analysis information according to embodiments refers to information indicating a physical state and/or an emotion state of a driver, which is analyzed based on the state information. For example, the analysis information indicates a numerical value of the driver's physical state.

The state analysis device 1001 according to embodiments may include a processor that has an associated non-transitory memory storing software instructions which, when executed by the processor, provides the functionalities of an image analysis device 1004, a voice analysis device 1005, and/or a biometric signal analysis device 1006. In some exemplary embodiments, the processor may take the form of one or more processor(s) and associated memory storing program instructions which provide the functionalities of the above respective devices 1004, 1005 and 1006. Each of the one or more processor(s) may include a communicating module (e.g., a transmitter/receiver, etc.) so as to communicate with sensors or input devices for obtaining information required for various analyses. A detailed description of the image analysis device 1004, the voice analysis device 1005, and the biometric signal analysis device 1006 according to embodiments will be described later with reference to FIG. 2.

The modeling information generation device 1002 (or a vibration signal modeling information generation device) according to embodiments may generate vibration signal modeling information for the vibration of the vehicle based on the analysis information. The vibration signal modeling information according to embodiments may be information for modeling a vibration signal to be delivered to a seat or steering wheel of a vehicle. A detailed description of the vibration signal modeling information according to embodiments will be described later with reference to FIG. 3. A detailed description of a process of generating the vibration signal modeling information according to embodiments will be described later with reference to FIG. 4.

The vibration signal generation device 1003 according to embodiments may generate a vibration signal based on the generated vibration signal modeling information and driving information of the vehicle. The driving information according to embodiments may be information for determining whether the vehicle described above is in a driving disturbance state. For example, the driving information includes speed information of a vehicle. A detailed description of a process in which the vibration signal generation device 1003 according to embodiments generates a vibration signal will be described later with reference to FIG. 5.

According to the method described in this drawing, the apparatus 1000 according to embodiments may generate an appropriate vibration signal by determining a vehicle driver's physical state or emotion. Moreover, the apparatus 1000 according to embodiments may generate a vibration signal, for which the safety of a driver is considered, further in consideration of the driving disturbance state of the vehicle based on the driving information.

Figure 2:
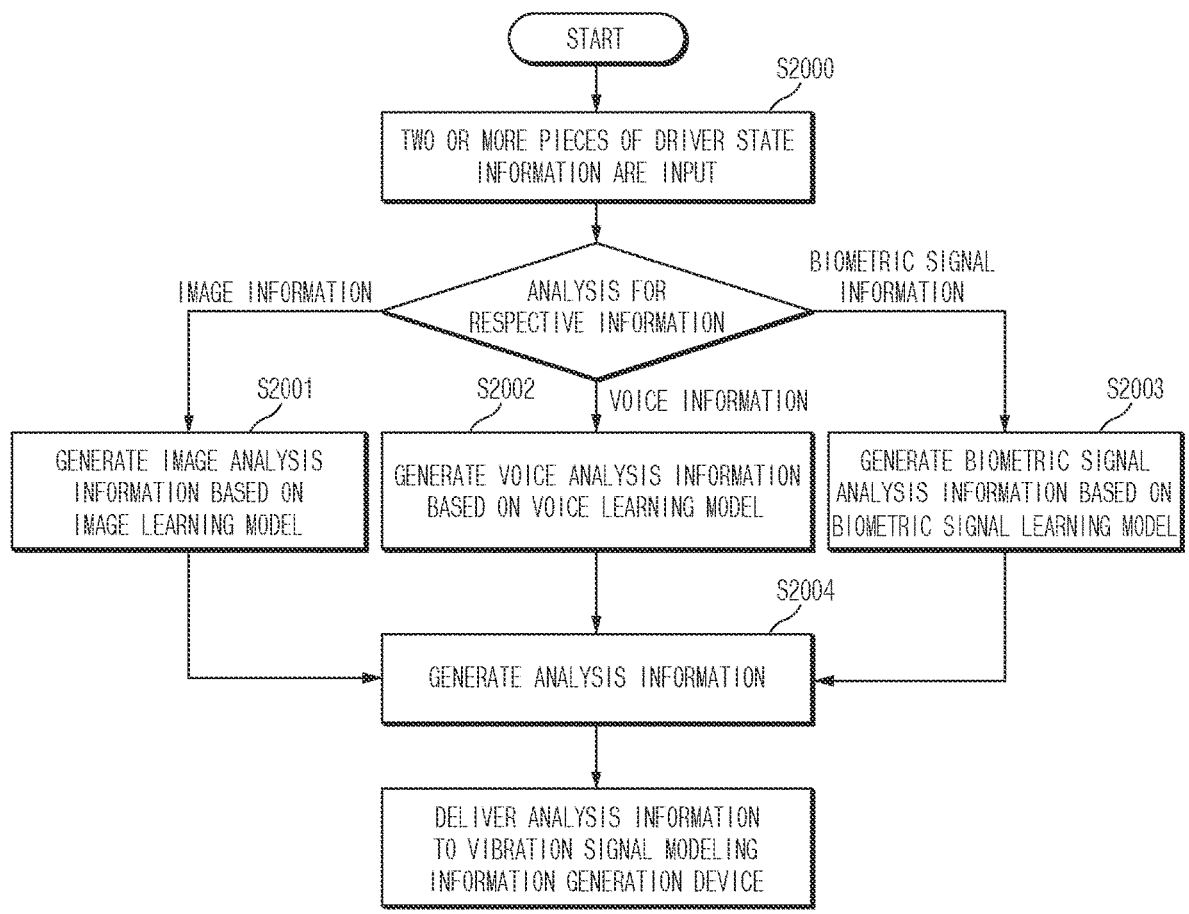
FIG. 2 is a flowchart illustrating an example of an operation of an image analysis device, according to embodiments.

FIG. 2 is a flowchart illustrating an example of an operation of an image analysis device, according to embodiments.

This drawing is a flowchart illustrating an example of an operation of an image analysis device (the image analysis device 1004 of FIG. 1) according to embodiments.

As described above in FIG. 1, the image analysis device 1004 according to embodiments may receive state information of a driver of a vehicle and may generate analysis information based on the received state information. As described above in FIG. 1, the state information according to embodiments may include at least one of driver image information, driver voice information, or driver biometric signal information.

An image analysis device 1004 according to embodiments may operate when two or more pieces of driver state information are input (S2000). For example, the image analysis device 1004 operates when the driver image information and the driver voice information are input.

The image analysis device 1004 according to embodiments may perform analysis for respective input information.

The image analysis information, voice analysis information, and biometric signal analysis information respectively generated by the image analysis device 1004, the voice analysis device 1005, and the biometric signal information analysis device according to embodiments may be included in the analysis information described above with reference to FIG. 1.

The image analysis device 1004 according to embodiments may generate image analysis information based on the input driver image information. The driver image information according to embodiments may include at least one of a face image of the driver or a pupil image of the driver.

The image analysis device 1004 according to embodiments may generate image analysis information based on an image artificial intelligence learning model (S2001). For example, the image analysis device 1004 generates image analysis information based on a fast region-based convolutional network (R-CNN) algorithm. The image analysis device 1004 may estimate the driver's pulse rate based on a blood flow image included in the above-described face image of the driver, or may estimate the driver's emotion or physical state based on the driver's pupil image.

The voice analysis device 1005 according to embodiments may generate voice analysis information based on a voice artificial intelligence learning model (S2002). For example, the voice analysis device 1005 generates voice analysis information through Fast Fourier Transform (FFT) analysis on voice information. The voice analysis device 1005 may estimate the emotion or physical state of the driver based on the frequency of the driver's voice, a timbre change of the driver's voice, or the like included in the driver's voice information described above.

A biometric signal analysis device 1006 according to embodiments may generate biometric signal analysis information based on driver biometric signal information. The driver biometric signal information according to embodiments may include at least one of pulse information of the driver, body temperature information of the driver, or brain wave information of the driver.

The biometric signal analysis device 1006 according to embodiments may generate biometric signal analysis information based on an artificial intelligence learning model (S2003). The biometric signal analysis device 1006 may estimate the emotion or physical state of the driver based on pulse information, body temperature information, or brain wave information included in the biometric signal information.

The state analysis device according to embodiments may generate analysis information based on the generated image analysis information, voice analysis information, and/or biometric signal analysis information (S2004). As described above in FIG. 1, the analysis information according to embodiments indicates a physical state and/or an emotion state of a driver, which is analyzed based on the state information.

The state analysis device according to embodiments may deliver the generated analysis information to the vibration signal modeling information generation device (the modeling information generation device 1002 of FIG. 1).

According to the method described in this drawing, the apparatus 1000 according to embodiments may generate an appropriate vibration signal by determining a vehicle driver's physical state or emotion. Moreover, the apparatus 1000 according to embodiments may generate a vibration signal, for which the safety of a driver is considered, further in consideration of the driving disturbance state of the vehicle based on the driving information.

Figure 3:
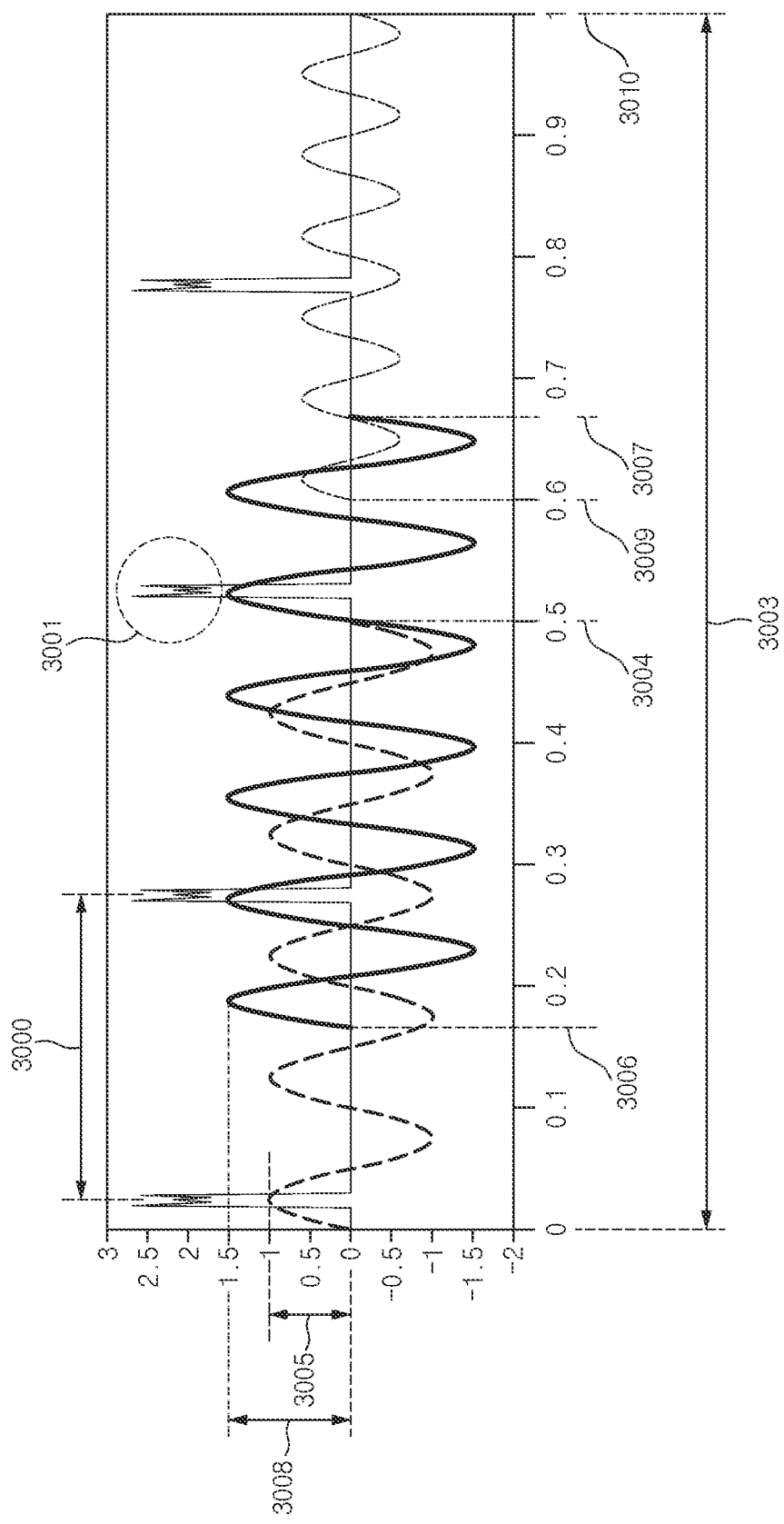
FIG. 3 is a view for describing an example of vibration signal modeling information, according to embodiments.

FIG. 3 is a view for describing an example of vibration signal modeling information, according to embodiments.

This drawing shows an example of vibration signal modeling information (the vibration signal modeling information described in FIG. 1) according to embodiments.

As described above in FIG. 1, the vibration signal modeling information generation device (the modeling information generation device 1002 of FIG. 1) may generate vibration signal modeling information for vibration (vibration of the vehicle described above in FIG. 1) of a vehicle, based on the generated analysis information (the analysis information described above in FIGS. 1 to 2). The vibration signal modeling information according to embodiments may be modeling information for implementing vibration in a seat or steering wheel of a vehicle.

The vibration signal modeling information according to embodiments is expressed as a vibration waveform, and may include one or more vibration components. The vibration components according to embodiments may be units constituting vibration signal modeling information. Vibration signals constituting the vibration signal modeling information according to embodiments may include at least one of a beat vibration component or a harmony vibration component. The beat vibration component may indicate a vibration component having a beat type. The harmony vibration component may indicate a vibration component composed of two or more vibration components. The vibration signal modeling information according to embodiments may further include at least one of period information of each vibration component, playback time point information of each vibration component, stop time point information of each vibration component, or playback time information of each vibration component.

The waveforms shown in this drawing indicate examples of one beat vibration component and one harmony vibration component (e.g., a harmony vibration component composed of first to third components) that constitute the vibration signal modeling information.

For example, the vibration signal modeling information may further include period information of a beat vibration component, shape and magnitude information of the beat vibration component, playback time information of a harmony vibration component, amplitude information of each of first to third components, playback time point information of each of first to third components, or stop time point information of each of first to third components.

'3000' may indicate period information of the above-described beat vibration component. '3001' may indicate beat shape and magnitude information of the above-described beat vibration component.

'3003' may indicate playback time information of the above-mentioned harmony vibration component. '3004' may indicate stop time point information of the first component constituting the harmony vibration component. '3005' may indicate amplitude information of the first component constituting the harmony vibration component. '3006' may indicate playback time point information of the second component constituting the harmony vibration component. '3007' may indicate stop time point information of the second component constituting the harmony vibration component. '3008' may indicate amplitude information of the second component constituting the harmony vibration component. '3009' may indicate playback time point information of the third component constituting the harmony vibration component. '3010' may indicate stop time point information of the third component constituting the harmony vibration component.

As described above, the vibration signal modeling information according to embodiments may be expressed as a combination of one or more vibration components. A method of generating vibration signal modeling information by combining one or more vibration components may be the same as or similar to a method for composing music. In other words, a beat vibration component may correspond to percussion sound effects. The vibration components constituting a harmony vibration component may correspond to the keyboard sound composing each harmony.

According to the method described in this drawing, the apparatus 1000 according to embodiments may generate an appropriate vibration signal by determining a vehicle driver's physical state or emotion. Moreover, the apparatus 1000 according to embodiments may generate a vibration signal, for which the safety of a driver is considered, further in consideration of the driving disturbance state of the vehicle based on the driving information.

Figure 4:
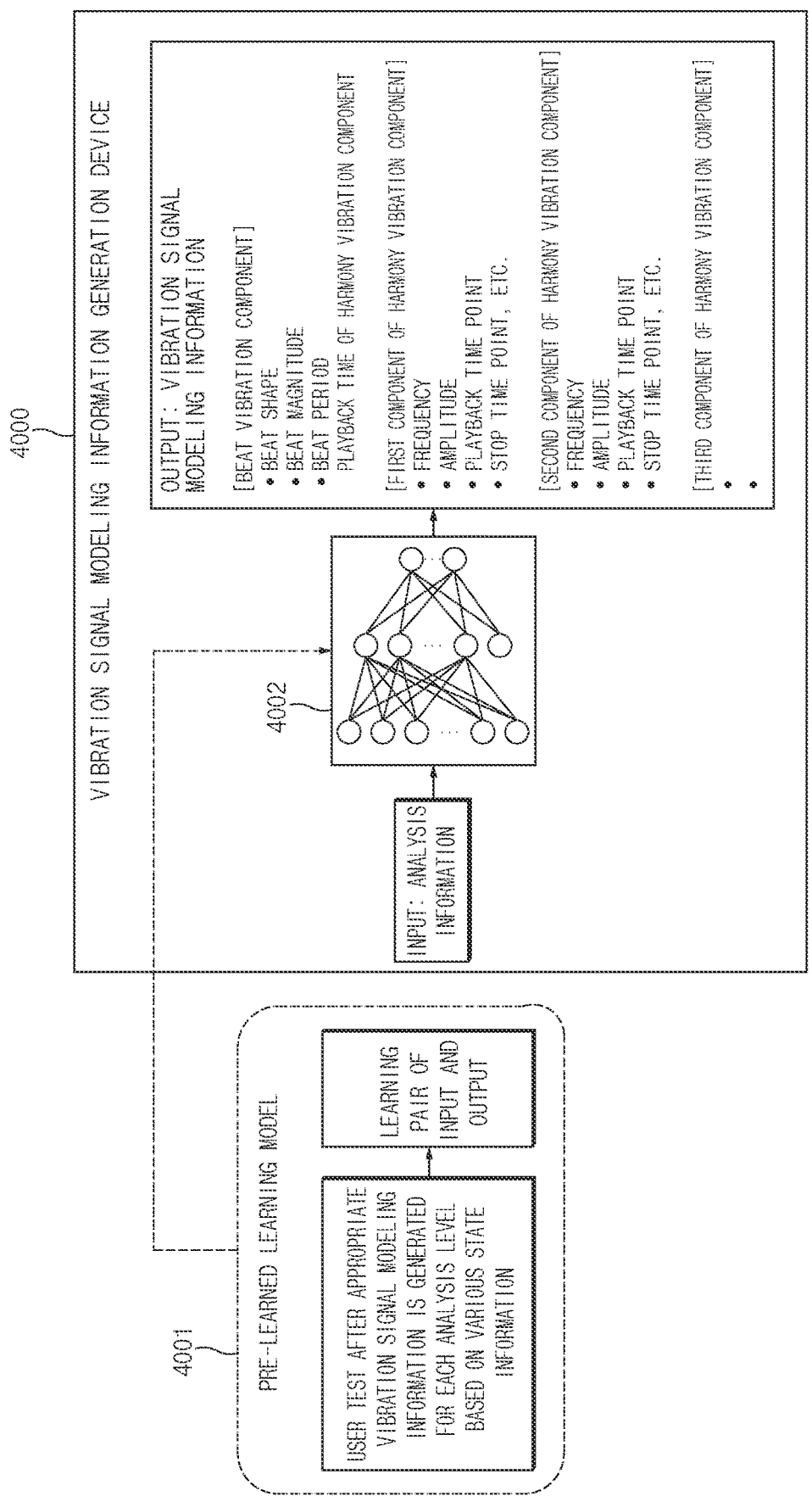
FIG. 4 is a view for describing an example of an operation of a vibration signal modeling information generation device, according to embodiments.

FIG. 4 is a view for describing an example of an operation of a vibration signal modeling information generation device, according to embodiments.

This drawing is a view for describing an example of an operation of a vibration signal modeling information generation device 4000 (the vibration signal modeling information generation device described in FIGS. 1 and 3) according to embodiments.

A vibration signal modeling information generation device according to embodiments may generate vibration signal modeling information based on an artificial intelligence learning model. That is, the vibration signal modeling information may be generated after analysis information is entered into an artificial intelligence learning model.

When a pair of an input and an output is given as data, the artificial intelligence learning model described above may be a supervised learning model for learning a mapping between an input and an output. The learning method used by the artificial intelligence learning model according to embodiments is not limited to the above-described example.

The artificial intelligence learning model 4001 according to embodiments may be a pre-learned learning model. The artificial intelligence learning model may be learned to generate appropriate vibration signal modeling information for respective analysis information based on various driver state information. For example, the artificial intelligence learning model refers to a supervised learning model that is learned to output vibration signal modeling information corresponding to input analysis information when analysis information based on a driver's state information is input. Whether the above-described vibration signal modeling information is suitable may be verified through a user test.

As described above, the vibration signal modeling information generation device according to embodiments may perform a process 4002 of predicting appropriate vibration signal modeling information based on the input analysis level and the pre-learned learning model.

As described above in FIG. 3, the predicted (or generated) vibration signal modeling information according to embodiments may include information about one or more vibration components. For example, the predicted vibration signal modeling information may include a beat vibration component and a harmony vibration component. Moreover, the vibration signal modeling information may include a beat shape of a beat vibration component, a beat magnitude of the beat vibration component, a beat period of the beat vibration component, a playback time of a harmony vibration component, a frequency of a first component of the harmony vibration component, a playback time point of the first component of the harmony vibration component, a stop time point of the first component of the harmony vibration component, a frequency of a second component of the harmony vibration component, a playback time point of the second component of the harmony vibration component, a stop time point of the second component of the harmony vibration component, and the like.

According to the method described in this drawing, the apparatus 1000 according to embodiments may generate an appropriate vibration signal by determining a vehicle driver's physical state or emotion. Moreover, the apparatus 1000 according to embodiments may generate a vibration signal, for which the safety of a driver is considered, further in consideration of the driving disturbance state of the vehicle based on the driving information.

Figure 5:
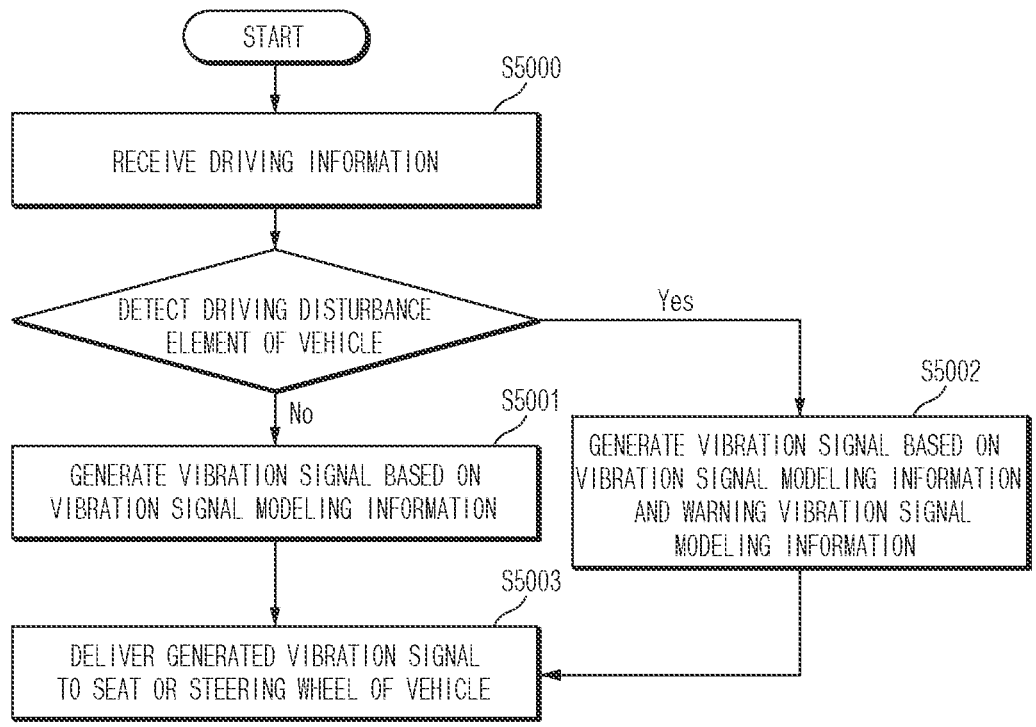
FIG. 5 is a flowchart illustrating an example of an operation of a vibration signal generation device, according to embodiments.

FIG. 5 is a flowchart illustrating an example of an operation of a vibration signal generation device, according to embodiments.

This drawing is a flowchart illustrating an example of an operation of a vibration signal generation device (the vibration signal generation device 1003 of FIG. 1) according to embodiments.

As described above in FIG. 1, the vibration signal generation device according to embodiments may generate a vibration signal based on the generated vibration signal modeling information and driving information of the vehicle.

As described above in FIG. 1, the driving information according to embodiments may be information for determining whether the vehicle is in a driving disturbance state. The driving information according to embodiments may be measured by one or more sensors included in a vehicle and may be entered to a vibration signal generation device. For example, the driving information is entered to the vibration signal generation device based on controller area network (CAN) communication.

The vibration signal generation device according to the embodiments may determine whether the driving of a vehicle is disturbed, based on the driving information. The driving information according to embodiments may include speed information of a vehicle, and the like.

As described above, the vibration signal generation device according to the embodiments may receive driving information (S5000).

The vibration signal generation device according to embodiments may generate a vibration signal based on vibration signal modeling information when the driving information indicates that the vehicle is not in a driving disturbance state (S5001).

The vibration signal generation device according to embodiments may generate a vibration signal based on vibration signal modeling information and warning vibration signal modeling information when the driving information indicates that the vehicle is in the driving disturbance state (S5002).

The warning vibration signal modeling information according to embodiments may be a vibration for calling attention to a vehicle driver. For example, the warning vibration signal modeling information may include only the beat vibration component described above in FIG. 3.

That is, the vibration signal according to the embodiments may be generated based on at least one of vibration signal modeling information or warning vibration signal modeling information.

The vibration signal generation device (or an apparatus 1000 for generating vibration for a vehicle) according to embodiments may deliver the generated vibration signal to at least one of a seat of the vehicle or a steering wheel of the vehicle (S5003). The seat or steering wheel that has received the vibration signal may implement vibration corresponding to the vibration signal based on a built-in actuator.

According to the method described in this drawing, the apparatus 1000 according to embodiments may generate an appropriate vibration signal by determining a vehicle driver's physical state or emotion. Moreover, the apparatus 1000 according to embodiments may generate a vibration signal, for which the safety of a driver is considered, further in consideration of the driving disturbance state of the vehicle based on the driving information.

Figure 6:
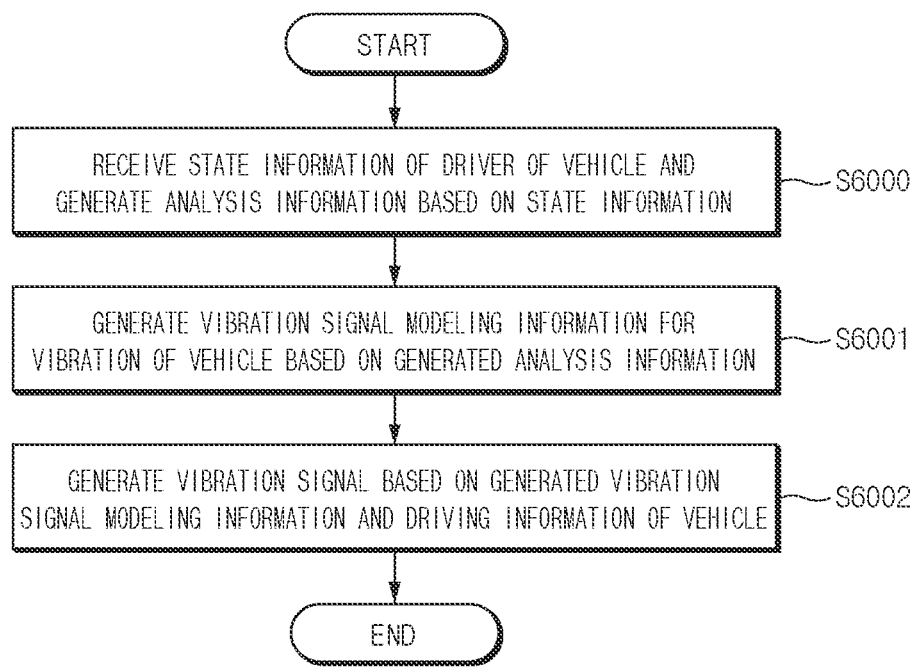
FIG. 6 is a flowchart illustrating an example of a vibration generating method for a vehicle, according to embodiments.

FIG. 6 is a flowchart illustrating an example of a vibration generating method for a vehicle, according to embodiments.

This drawing is a flowchart illustrating an example of a vibration generating method (or method) for a vehicle according to embodiments. The method according to the embodiments may be performed by a vibration generating apparatus for a vehicle (an apparatus 1000 described above in FIG. 1).

The vibration generating method for a vehicle according to embodiments may include receiving state information of a driver of the vehicle and generating analysis information based on the state information (S6000), generating vibration signal modeling information for vibration of the vehicle based on the generated analysis information (S6001), and/or generating a vibration signal based on the generated vibration signal modeling information and driving information of the vehicle (S6002).

The state information of the driver according to embodiments may include at least one of driver image information, driver voice information, or driver biometric signal information. The detailed description of the state information of the driver is the same as or similar to that described above in FIGS. 1 to 4.

Step S6000 according to the embodiments may include generating image analysis information based on driver image information, generating voice analysis information based on driver voice information, and/or generating biometric signal analysis information based on driver biometric signal information. The description of the above-described steps is the same as or similar to that described above with reference to FIG. 2.

The analysis information according to embodiments may include at least one of image analysis information, voice analysis information, or biometric signal analysis information. The detailed description of analysis information is the same as or similar to that described above in FIGS. 1 to 4.

The driver image information according to embodiments may include at least one of a face image of the driver or a pupil image of the driver. The driver biometric signal information according to embodiments may include at least one of pulse information of the driver, body temperature information of the driver, or brain wave information of the driver.

The vibration signal modeling information according to embodiments may include one or more vibration components. The vibration signals according to embodiments may include at least one of a beat vibration component or a harmony vibration component. The vibration signal modeling information according to embodiments may include at least one of period information of each vibration component, playback time point information of each vibration component, stop time point information of each vibration component, or playback time information of each vibration component. A detailed description of the vibration signal modeling information according to embodiments is the same as or similar to that described above in FIG. 3.

The vibration signal modeling information may be generated after the analysis information is entered into an artificial intelligence learning model. The artificial intelligence learning model according to embodiments may be a learning model that is learned to output vibration signal modeling information corresponding to input analysis information when analysis information based on a vehicle driver's state information is input. A detailed description of the artificial intelligence learning model according to embodiments is the same as or similar to that described above in FIG. 4.

The driving information according to embodiments may include speed information of a vehicle. The vibration signal according to the embodiments may be generated based on at least one of vibration signal modeling information or warning vibration signal modeling information. A description of a method for generating a vibration signal according to embodiments is the same as or similar to that described above in FIG. 5.

Step S6002 according to embodiments may include generating the vibration signal based on the vibration signal modeling information and the warning vibration signal modeling information when the driving information indicates that the vehicle is in a driving disturbance state, and generating the vibration signal based on the vibration signal modeling information when the driving information indicates that the vehicle is not in the driving disturbance state. The detailed description of the above-described step is the same as or similar to that described above with reference to FIG. 5.

The method may further include delivering the generated vibration signal to at least one of a seat of the vehicle or a steering wheel of the vehicle. The detailed description of the above-described step is the same as or similar to that described above with reference to FIG. 5.

According to the method described in this drawing, the apparatus according to embodiments may generate an appropriate vibration signal by determining a vehicle driver's physical state or emotion. Moreover, the apparatus according to embodiments may generate a vibration signal, for which the safety of a driver is considered, further in consideration of the driving disturbance state of the vehicle based on the driving information.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

Embodiments may provide vibration for a vehicle generated in consideration of a driver's physical state or emotion.

In addition, embodiments may provide vibration for a vehicle generated further in consideration of a driving warning state of a vehicle in addition to the driver's physical state or emotion.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for generating vibration for a vehicle, the apparatus comprising:
  a processor configured to:
    receive state information of a driver of the vehicle and to generate analysis information based on the state information;
    generate vibration signal modeling information for the vibration of the vehicle based on the generated analysis information; and
    generate a vibration signal based on the generated vibration signal modeling information and driving information of the vehicle; and
  an actuator built in at least one of a seat of the vehicle or a steering wheel of the vehicle,
  wherein the driving information includes speed information of the vehicle,
  wherein the vibration signal is generated based on at least one of the vibration signal modeling information or warning vibration signal modeling information,
  wherein the warning vibration signal modeling information includes only a beat vibration component among the beat vibration component and a harmony vibration component,
  wherein the vibration signal is generated based on the vibration signal modeling information and the warning vibration signal modeling information when the driving information indicates that the vehicle is in a driving disturbance state,
wherein the vibration signal is generated based on the vibration signal modeling information when the driving information indicates that the vehicle is not in the driving disturbance state,
wherein the vibration signal modeling information includes one or more vibration components,
wherein the vibration components include at least one of the beat vibration component or the harmony vibration component,
wherein the beat vibration component includes a percussion sound effect,
wherein the harmony vibration component includes a keyboard sound composing harmony,
wherein the vibration signal modeling information is generated after the analysis information is inputted into an artificial intelligence learning model, and
wherein, when the analysis information generated based on the state information of the driver of the vehicle is inputted, the artificial intelligence learning model is learned to output the vibration signal modeling information corresponding to the inputted analysis information.

2. The apparatus of claim 1, wherein the state information of the driver includes at least one of driver image information, driver voice information, or driver biometric signal information.

3. The apparatus of claim 2, wherein the processor is further configured to:
generate image analysis information based on the driver image information;
generate voice analysis information based on the driver voice information; and
generate biometric signal analysis information based on the driver biometric signal information,
wherein the analysis information includes at least one of the image analysis information, the voice analysis information, or the biometric signal analysis information.

4. The apparatus of claim 2, wherein the driver image information includes at least one of a face image of the driver or a pupil image of the driver, and
wherein the driver biometric signal information includes at least one of pulse information of the driver, body temperature information of the driver, or brain wave information of the driver.

5. The apparatus of claim 1,
wherein the vibration signal modeling information includes at least one of period information of each of the one or more vibration components, playback time point information of each of the one or more vibration components, stop time point information of each of the one or more vibration components, or playback time information of each of the one or more vibration components.

6. The apparatus of claim 1, wherein the generated vibration signal is delivered to at least one of the seat of the vehicle or the steering wheel of the vehicle.

7. A method for generating vibration for a vehicle, the method comprising:
receiving, by a processor, state information of a driver of the vehicle and generating, by the processor, analysis information based on the state information;
generating, by the processor, vibration signal modeling information for the vibration of the vehicle based on the generated analysis information;
generating, by the processor, a vibration signal based on the generated vibration signal modeling information and driving information of the vehicle; and
implementing, by an actuator built in at least one of a seat of the vehicle or a steering wheel of the vehicle, vibration corresponding to the generated vibration signal,
wherein the driving information includes speed information of the vehicle,
wherein the vibration signal is generated based on at least one of the vibration signal modeling information or warning vibration signal modeling information, wherein the warning vibration signal modeling information includes only a beat vibration component among the beat vibration component and a harmony vibration component,
wherein the generating of the vibration signal includes:
generating, by the processor, the vibration signal based on the vibration signal modeling information and the warning vibration signal modeling information when the driving information indicates that the vehicle is in a driving disturbance state; and
generating, by the processor, the vibration signal based on the vibration signal modeling information when the driving information indicates that the vehicle is not in the driving disturbance state,
wherein the vibration signal modeling information includes one or more vibration components,
wherein the vibration components include at least one of the beat vibration component or the harmony vibration component,
wherein the beat vibration component includes a percussion sound effect,
wherein the harmony vibration component includes a keyboard sound composing harmony,
wherein the vibration signal modeling information is generated after the analysis information is inputted into an artificial intelligence learning model, and
wherein, when the analysis information generated based on the state information of the driver of the vehicle is inputted, the artificial intelligence learning model is learned to output the vibration signal modeling information corresponding to the inputted analysis information.

8. The method of claim 7, wherein the state information of the driver includes at least one of driver image information, driver voice information, or driver biometric signal information.

9. The method of claim 8, wherein the generating of the analysis information includes:
generating image analysis information based on the driver image information;
generating voice analysis information based on the driver voice information; and
generating biometric signal analysis information based on the driver biometric signal information,
wherein the analysis information includes at least one of the image analysis information, the voice analysis information, or the biometric signal analysis information.

10. The method of claim 8, wherein the driver image information includes at least one of a face image of the driver or a pupil image of the driver, and wherein the driver biometric signal information includes at least one of pulse information of the driver, body temperature information of the driver, or brain wave information of the driver.

11. The method of claim 7, wherein the vibration signal modeling information includes at least one of period information of each of the one or more vibration components, playback time point information of each of the one or more vibration components, stop time point information of each of the one or more vibration components, or playback time information of each of the one or more vibration components.

12. The method of claim 7, further comprising:
delivering, by the processor, the generated vibration signal to at least one of the seat of the vehicle or the steering wheel of the vehicle.

* * * * *